US006965666B1

(12) United States Patent
Zhang

(10) Patent No.: US 6,965,666 B1
(45) Date of Patent: Nov. 15, 2005

(54) SYSTEM AND METHOD FOR SENDING E-MAILS FROM A CUSTOMER ENTITY IN A TELECOMMUNICATIONS NETWORK

(75) Inventor: Baoquan A. Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 299 days.

(21) Appl. No.: 10/014,380

(22) Filed: Oct. 26, 2001

(51) Int. Cl.[7] .............................................. H04M 1/64
(52) U.S. Cl. .............................. 379/88.17; 379/93.24; 379/88.13; 455/412.1; 370/352
(58) Field of Search .......................... 379/88.13, 88.14, 379/88.17, 93.24; 455/413, 412.1, 414.4; 370/352, 353, 356, 355

(56) References Cited

U.S. PATENT DOCUMENTS

| | | | | |
|---|---|---|---|---|
| 5,555,346 | A * | 9/1996 | Gross et al. ................... | 706/45 |
| 6,014,711 | A * | 1/2000 | Brown ........................ | 709/245 |
| 6,020,980 | A * | 2/2000 | Freeman ..................... | 358/402 |
| 6,069,890 | A * | 5/2000 | White et al. ................. | 370/352 |
| 6,078,579 | A * | 6/2000 | Weingarten .................. | 370/352 |
| 6,085,231 | A * | 7/2000 | Agraharam et al. ......... | 709/206 |
| 6,185,204 | B1 * | 2/2001 | Voit ............................ | 370/352 |
| 6,304,636 | B1 * | 10/2001 | Goldberg et al. ......... | 379/88.14 |
| 6,333,973 | B1 * | 12/2001 | Smith et al. .............. | 379/88.12 |
| 6,396,908 | B1 * | 5/2002 | O'Donovan et al. ..... | 379/88.18 |
| 6,483,899 | B2 * | 11/2002 | Agraharam et al. ..... | 379/88.14 |

OTHER PUBLICATIONS

"Say hello to VXML", http://www.ciol.com/content/internet/bestweb/100102101.asp, Oct. 21, 2000, pp. 1-4.

"Qualcomm offers email via phone", Cnet news.com, Oct. 9, 1998, http://news.cnet.com/news/0-1003-200-334078.html?tag=rltdnws, pp. 1-2.

"Hear You E-Mail-free", David Essex, special to PC World, Jul. 31, 1998, http://www.pcworld.com/resource/printable/article/0,aid,7634,00.asp, p. 1.

"Busy? You need E-Fone", http://www.efone.au.com/efone.htm, p. 1.

"How does it work", http://www.efone.au.com/how_does_it_work.htm, p. 1.

"E-Fone—User Guide", Netline Technologies Tty Ltd, 2000, pp. 1-14.

* cited by examiner

*Primary Examiner*—Fan Tsang
*Assistant Examiner*—Simon Sing

(57) ABSTRACT

A system and method for sending an e-mail message from a subscriber entity in a telecommunications network are described. One exemplary method includes receiving a call request from a first subscriber entity to establish a call between the first subscriber entity and a second subscriber entity. The call request includes a management code and a destination identifier such as a MIN or a PSTN number associated with the second subscriber entity. The method further includes converting the destination identifier to one or more e-mail addresses associated with the second subscriber entity. Further, the method includes receiving a message from the first subscriber entity and sending the message to one or more e-mail addresses associated with the second subscriber entity. In one embodiment, the method further includes converting a voice message to a text message and sending the text message to one or more e-mail addresses associated with the second subscriber entity.

38 Claims, 9 Drawing Sheets

FIGURE 5

| PROFILE MANAGEMENT CODE ~150 | |
|---|---|
| CODE | ACTION |
| *62 | ROUTE A CALL TO A VOICE COMMAND PLATFORM / DETERMINE A DESTINATION IDENTIFIER OF A SECOND TYPE BASED ON A DESTINATION IDENTIFIER OF A FIRST TYPE |

FIGURE 6

| IDENTIFIER | E-MAIL ADDRESS |
|---|---|
| 913 123 4567 | john@sprint.com |
| 913 234 5678 | alex@sprint.com |
| 312 546 7890 | abcd@sprint.com |

200

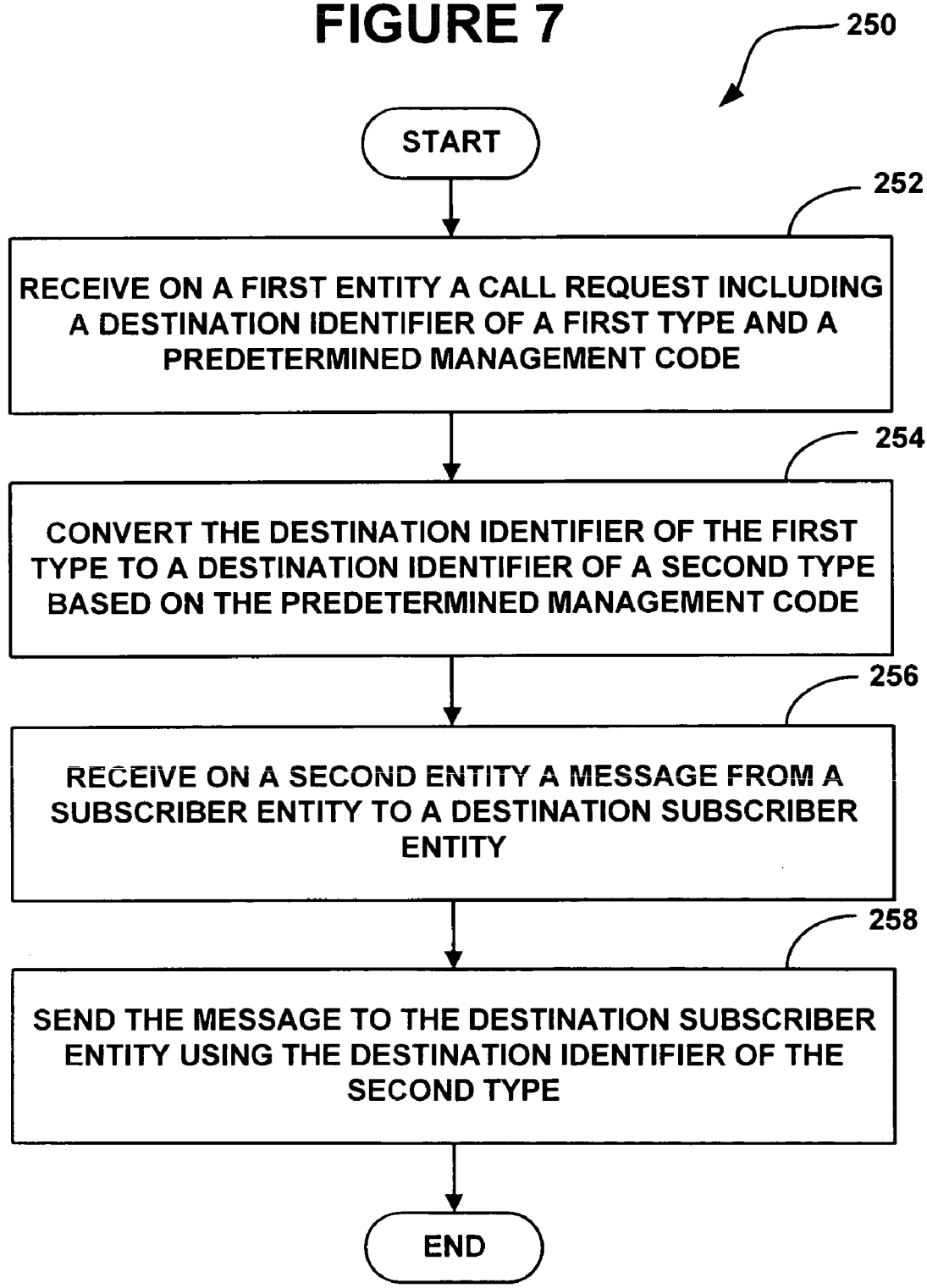

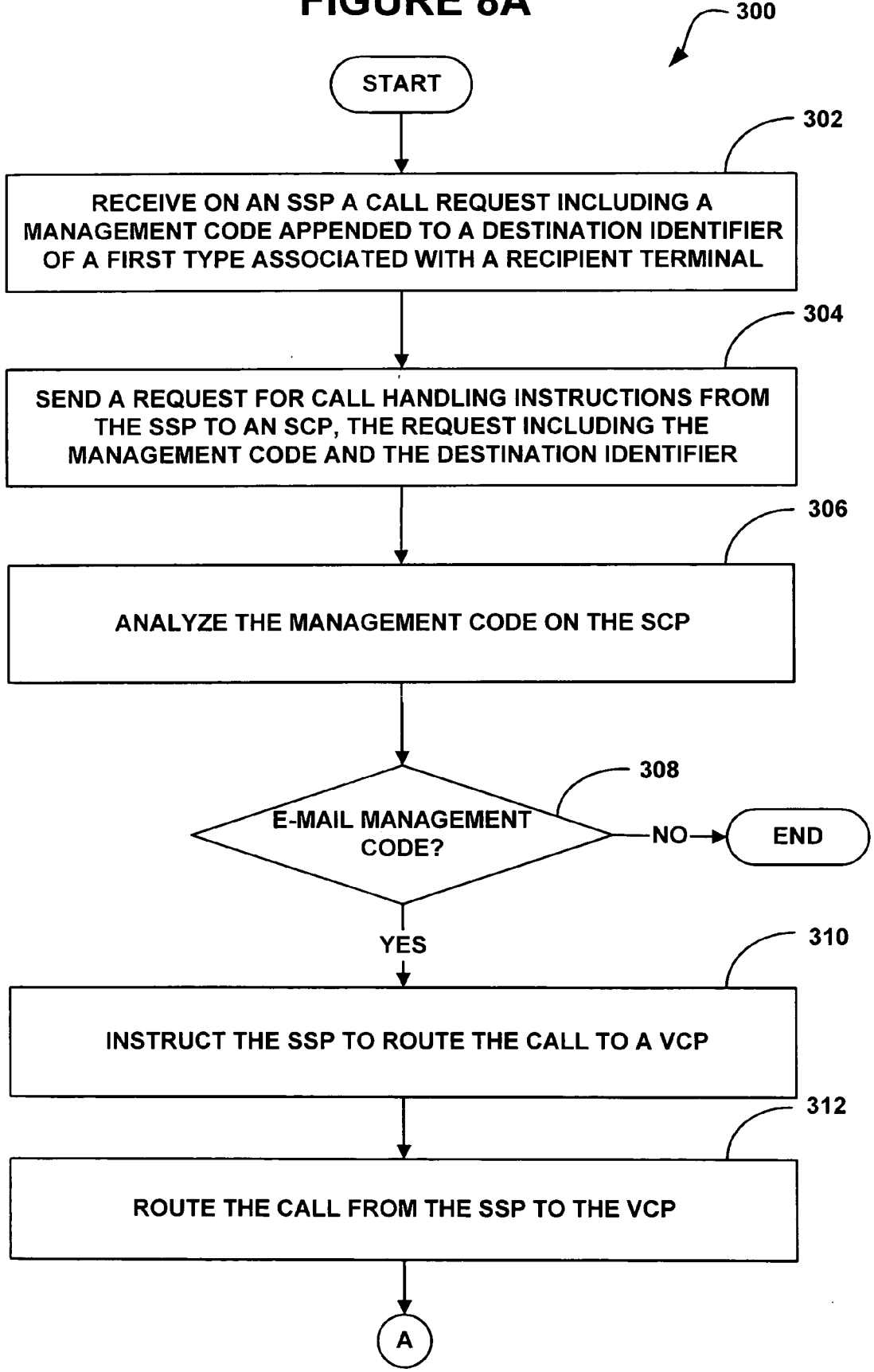

SYSTEM AND METHOD FOR SENDING E-MAILS FROM A CUSTOMER ENTITY IN A TELECOMMUNICATIONS NETWORK

BACKGROUND

1. Field of the Invention

The present invention relates to telecommunications services and, more particularly, to a method and system for using a customized profile management code to manage sending an e-mail from a subscriber entity.

2. Description of Related Art

Electronic messaging ("e-mail") is becoming an increasingly popular way for people to communicate with each other. Typically, a message sender uses a computer connected to a network and sends a message to a recipient who is using a computer connected to the same or another network. With a growing popularity of wireless telephones, service providers have developed techniques to provide Internet access and e-mail services to wireless telephone users.

Short Messaging Service technology, commonly referred to as "SMS," enables users to send messages using their wireless telephones. SMS, otherwise known as text messaging, mobile messaging, or alphanumeric paging, is a digital cellular network feature that enables subscribers to send short text and numeric messages to and from wireless phones.

While SMS is convenient and often cost effective, there are several drawbacks of using it compared to using standard e-mail messages. Even though both e-mail and SMS utilize gateways to send messages from senders to recipients, the most obvious differences between the two are the possible length and complexity of the messages. SMS messages are limited to between 80 to 500 characters depending on the service provider, and a typical SMS message is about 120 characters. Further, while e-mail enables users to attach files, embed images, and make use of Hypertext Markup Language ("HTML"), SMS messages are limited to text and numerical characters.

Therefore, many wireless telephone users prefer to send e-mail messages rather than SMS messages. One of the existing mechanisms that may be employed to send an e-mail message from a wireless telephone handset involves use of a wireless web interface. This mechanism requires a user to access a web application server and then type an e-mail address and message to be sent to a recipient. While this mechanism enables users to send e-mails, the majority of users cannot type e-mail addresses and text messages very quickly and conveniently using wireless telephone keypads, due to typical keypad limitations. Consequently, a need exists for a method of sending e-mail messages from telephone handsets.

SUMMARY

The present invention provides a method and system for providing a message in a telecommunications system.

One exemplary method for providing a message to at least one network entity in a telecommunications network involves receiving a call request to connect a call from an originating subscriber entity to a destination subscriber entity. The call request includes a management code and a destination identifier of a first type, such as a telephone number. The method then involves converting the destination identifier of the first type to a destination identifier of a second type, such as an e-mail address associated with the destination subscriber entity, in response to receiving the management code in the call request. Further, the method involves receiving a message from the subscriber entity and sending the message to the destination subscriber entity using the destination identifier of the second type.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 5 is an illustration of a portion of a subscriber profile maintained in a central control point or a database illustrated in FIG. 3;

FIG. 6 is an illustration of portions of a recipient profile maintained by the database of FIG. 3;

FIG. 7 is a flow chart illustrating a method for sending an e-mail from a first subscriber entity to a second subscriber entity in accordance with the exemplary embodiment; and FIGS. 8A and 8B are a flow chart illustrating an exemplary method for sending e-mail from a first subscriber entity to a second subscriber entity in the telecommunications network illustrated in FIG. 3.

DETAILED DESCRIPTION OF AN EXEMPLARY EMBODIMENT

Figure 1:
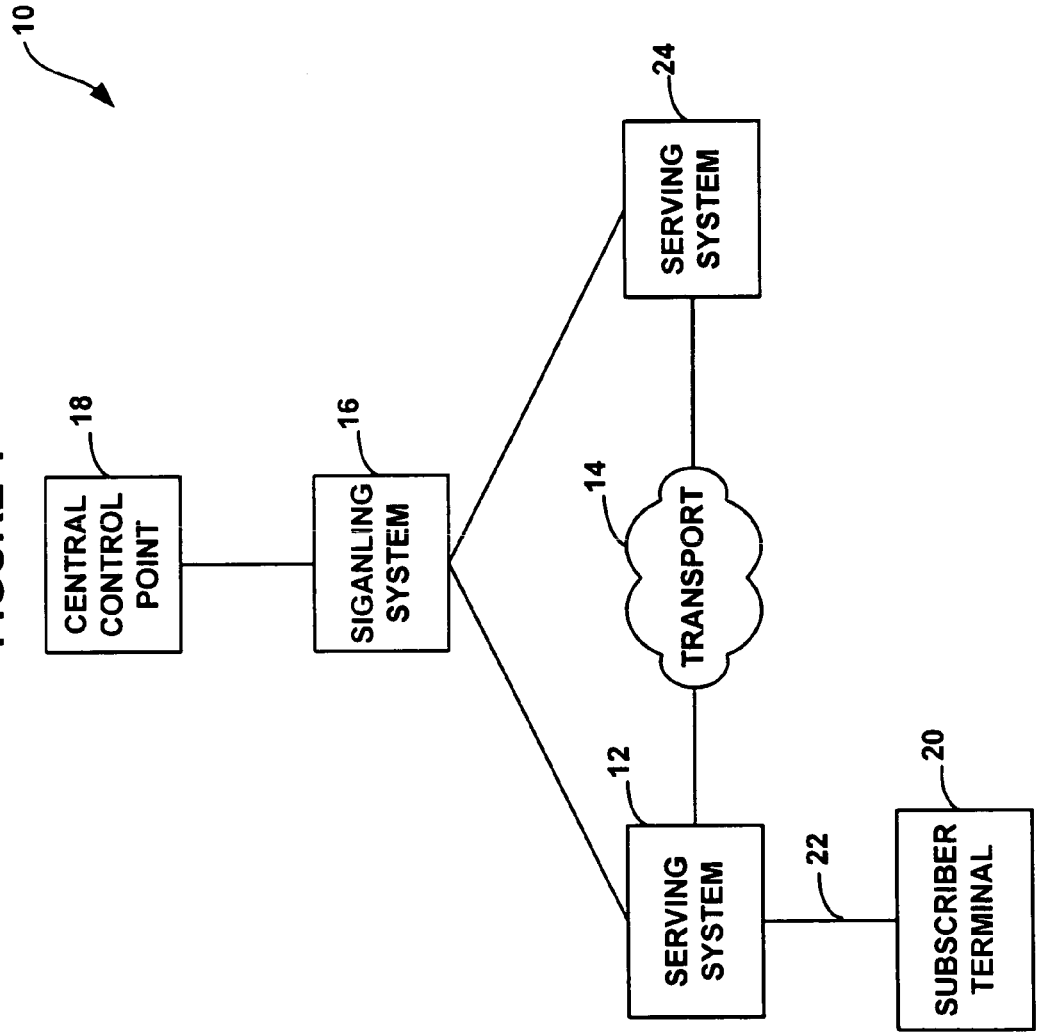
FIG. 1 is a simplified block diagram illustrating a telecommunications network including a serving system and a central control node.

Referring to the drawings, FIG. 1 illustrates a simplified block diagram of a telecommunications network 10. As shown in FIG. 1, network 10 includes a serving system 12 interconnected to (or part of) a transport network 14 and to a signaling system 16. The signaling system 16 is further interconnected to at least one central control point ("CCP") 18. Network 10 further includes a plurality of subscriber terminals, of which exemplary terminal 20 is shown. Terminal 20 may take any suitable form, such as, for instance, a telephone, a computer, or a personal digital assistant ("PDA"). Terminal 20 may then be coupled to serving system 12 by an appropriate link 22, which may comprise wireline or wireless portions.

This and other arrangements described herein are shown for purposes of illustration only, and those skilled in the art will appreciate that other arrangements and other elements (e.g., machines, interfaces, functions, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location. Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

Serving system 12 includes a set of stored logic that defines how to process calls involving one or more terminals, such as terminal 20. The stored logic may include a number of trigger points that cause the serving system to seek guidance from CCP 18 in response to various conditions. When serving system 12 encounters a trigger, the serving system may pause call processing and send a signaling message via signaling system 16 to CCP 18, carrying various parameters. For calls originating from terminal 20, the signaling message may, for instance, convey an identification of the terminal and the digit sequence dialed by the subscriber. For calls terminating to terminal 20, the signaling message may, for instance, convey an identification of the terminal and an indication of the calling party. Of course, these are only examples; the messages may convey these and/or other parameters.

CCP 18 also includes a set of stored logic. When CCP 18 receives the signaling message from serving system 12, CCP 18 will execute its stored logic so as to parse the message, identify its parameters, and responsively carry out one or more functions. For example, in response to a call-origination signaling message, CCP 18 may determine that the subscriber dialed a toll-free number (e.g., an 800, 888 or 877 number). Conventionally, the CCP's logic may then cause the CCP to reference a database in order to translate the toll-free number into an actual routing number associated with the called party. The CCP may then generate and send to serving system 12 a response message instructing serving system 12 to route the call to the actual routing number. In turn, serving system 12 would then set up and connect the call over transport network 14 to that routing number.

Figure 2:
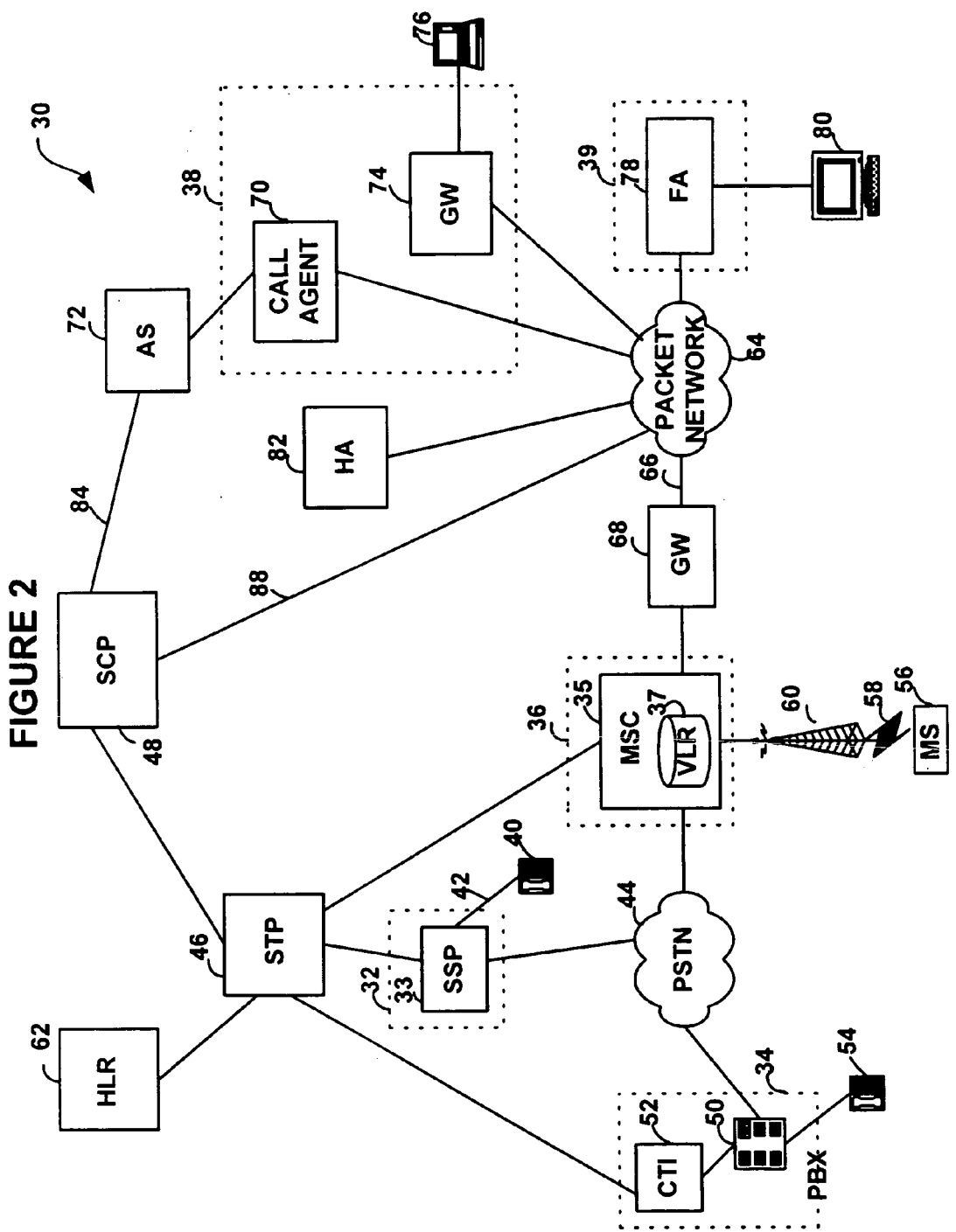
FIG. 2 is a block diagram illustrating a telecommunications network including a plurality of serving nodes and central control points.

Network 10 is a generically representative of an Advanced Intelligent Network ("AIN") arrangement in which an exemplary embodiment of the present invention can be implemented. The particular arrangement, however, may take any of a variety of forms. To further illustrate arrangements in which the invention can be implemented, FIG. 2 depicts a network 30, which comprises at least five example serving systems, designated respectively by reference numerals 32, 34, 36, 38 and 39.

Example serving system 32 is principally a landline serving system, which typically comprises a landline switch (SSP) 33, such as a Nortel DMS-100 or DMS-250. Serving system 32 serves a plurality of landline subscriber stations, of which an exemplary station 40 is shown coupled by link 42 (typically a twisted copper pair of wires), and the SSP includes a set of logic indicating how to process calls involving those stations. Serving system 32 is coupled to a transport network such as the public switched telephone network ("PSTN") 44, and further to a signaling network represented by STP 46. In turn, signaling network is coupled to a central control point such as service control point (SCP) 48. SCP 48 includes a set of service logic to perform AIN functions for calls being served by system 32. When serving system 32 encounters a predefined trigger point in its service logic, it pauses call processing and sends a signaling message via STP 46 to SCP 48. SCP 48 interprets the message and applies its own service logic, and SCP 48 then typically returns a response signaling message via STP 46 to serving system 32, instructing serving system 32 how to handle the call.

Example serving system 34 comprises a PBX server 50 coupled to a computer telephony interface ("CTI") 52. Such a serving system may serve a plurality of subscriber stations (e.g., corporate telephones or the like), an exemplary one of which is shown as station 54 for instance. The serving system (typically CTI 52) may maintain one or more subscriber profiles that define service parameters for the various stations being served. When the serving system receives a call to or from station 54, the CTI may then apply a set of logic based on the associated subscriber profile and, in doing so, may encounter a trigger point that causes the CTI to query SCP 48 for guidance. The CTI might then pause processing and send a signaling message via STP 46 to SCP 48, and the SCP might then apply its own service logic and send a response message to the CTI instructing system 34 how to handle the call. In one embodiment, CTI 52 and SCP 48 may communicate via the Internet or a Transmission Control Protocol/Internet Protocol ("TCP/IP") interface such as a Telcordia two-way Generic Data Interface ("GDI") between CTI 52 and Telcordia ISCP.

Example serving system 36 is principally a wireless serving system, which typically comprises a mobile switching center (MSC) 35, such as a Lucent or Nortel MSC. Serving system 36 serves a plurality of wireless subscriber stations, of which an exemplary station 56 is shown coupled via an air interface 58 and base station 60. Serving system 36 further typically includes a visitor location register (VLR) 37, which maintains service logic (e.g., profiles) for wireless stations currently being served by system 36. Serving system 36 is also coupled via STP 46 to a home location register (HLR) 62, which, in this example, serves as the home register for wireless station 56. HLR 62 may perform Wireless Intelligent Network ("WIN") functions for calls being served by system 36. For instance, when serving system 36 receives a call for station 56 and station 56 is busy, serving system 36 may encounter a trigger and responsively pause processing and send a signaling message via STP 46 to HLR 62. HLR 62 would then interpret the message and apply its own service logic, and HLR 62 would then return a response signaling message via STP 46 to serving system 36, instructing serving system 36 how to handle the call. In addition, SCP 48 may perform AIN functions for serving system 36 in a similar fashion. Alternatively, the HLR and SCP might communicate with each other, to have one execute service logic based on parameters provided by the other.

Traditional landline and wireless communications networks have been based principally on a circuit-switched arrangement, in which a switch (e.g., SSP or MSC) sets up and reserves an actual circuit with a remote switch, maintaining the circuit for the duration of the call. Recognizing the inherent inefficiency of this arrangement, the telecommunications industry has begun to embrace various "next generation networks" instead. Such net works typically employ packet-switched communication links (in addition to or instead of circuit-switched links). A gateway or "network access server" typically receives a media stream (e.g., voice, video, etc.) and/or a pure data stream and encodes and packetizes the stream into a sequence of packets. Each packet bears a header identifying its source and destination address as well as other information. The packets may be routed independently from node to node through a network and then re-ordered and reassembled by a gateway at the destination end for output to a receiving entity (e.g., person or machine). Alternatively, the packets may follow an established "virtual circuit," each traversing the same path from node to node and ultimately to the destination gateway.

For purposes of illustration, example serving system 36 is shown coupled to two transport networks, PSTN 44 and a packet-switched network 64 (such as the Internet, for instance). Serving system 36 may be coupled to the packet network 64 by a link 66 that includes an "interworking function" (IWF) or gateway 68, which is arranged to convert between circuit-switched voice and/or data transmissions handled by system 36 and a packet sequence appropriate for transport over network 64 (e.g., as an ATM or Voice over IP transmission). (In practice, the IWF might hang off of a trunk of MSC 35.) In this way, serving system 36 can provide connectivity for wireless subscriber station 56 over both the PSTN and the packet-switched network. Other next generation network arrangements are possible as well.

As presently contemplated, next generation networks may employ AIN principles as well. For example, a network access server may communicate with a "call agent" node on the packet-switched network. The call agent node may serve as a gatekeeper, typically including connection manager, connection performer, and service management layers for routing calls through the packet network. (The call agent node may also be referred to as a "service manager," or "soft switch.") To take advantage of existing architecture, the service logic for providing AIN telecommunications services then typically resides on a separate "application server" also coupled with the packet-switched network or coupled directly with the call agent node. (The application server may itself be an SCP, for instance). The call agent and gateway may cooperatively be considered a type of "serving system" for a media stream and/or data stream being transmitted in a packet switched network, and the application server may be considered a type of central control point. As in traditional AIN arrangements, the serving system may then query the central control point, providing parameters such as the source and destination addresses, and the central control point can execute appropriate service logic and return call handling instructions. For instance, the application server may direct the serving system to redirect the packet stream to a "forwarding" address or other location.

As shown in FIG. 2, for instance, serving system 38 comprises a call agent node 70 (e.g., a Telcordia Service Manager or a Lucent Softswitch), which is coupled to (or a node on) packet network 64. Call agent node 70 is in turn coupled to an application server ("AS") node 72, which may itself be an application residing on an SCP, HLR, CTI or similar entity. (For instance, as presently contemplated, AS 72 and SCP 48 may be provided as a common entity). Alternatively, both the call agent node and the application server node might be independent nodes on packet network 64. Serving system 38 may further comprise a gateway ("GW") or other such node (e.g., switch, hub, router, etc.), which may seek to route packets representing real-time media (e.g., voice, video, etc.) and/or data streams over the packet network. An example of such a gateway node is shown in FIG. 2 as gateway 74. Gateway 74 may provide subscriber stations with connectivity to the packet network. A representative station is shown as station 76.

Call agent node 70 may maintain a set of subscriber profile logic, including parameters such as trigger points, for subscribers such as station 76. When gateway 74 or another node seeks to route a packet sequence to or from station 76, the node may then communicate with call agent 70 (e.g., via a protocol such as MGCP, SGCP, SIP or H.323) to obtain call handling instructions. Call agent 70 may in turn encounter a trigger point in the subscriber profile and responsively communicate with AS 72 to obtain AIN service. In practice, call agent 70 may communicate with AS 72 according to an AIN 0.2-like protocol, over TCP/IP, or according to any other suitable protocol (e.g., SIP, H.323 or straight SS7).

Thus, for instance, call agent 70 may generate and send to AS 72 a TCAP query message defining various parameters, and AS 72 may responsively employ an appropriate set of service logic and then generate and send to call agent 70 a TCAP response message. Call agent 70 may then instruct gateway 74 accordingly. In this arrangement, the CCP thus comprises AS 72. From another perspective, however, the CCP may be considered to include call agent 70, for instance, to the extent the call agent also provides AIN service logic to assist the gateway in handling call traffic.

Example serving system 39 illustrates another type of next generation, packet-switched network arrangement. This arrangement, known as "Mobile IP," has emerged to serve nomadic users (terminals) who connect to a wireline (or possibly wireless) network. Mobile IP ("MIP") attempts to solve a problem that arises when a mobile terminal with a permanent network address (e.g., internet protocol (IP) address) in one sub-network changes physical locations, such as moving to another sub-network. The arrangement works somewhat like a postal forwarding system. Each terminal is assigned a permanent address that is maintained by a "home agent," which might be a gateway or other entity in the terminal's home sub-network. When the terminal travels to another sub-network, the home agent will receive packets destined for the terminal. The home agent will then add a new header to the packets (or modify their existing headers) and forward them to a "foreign agent," which is a node serving the foreign sub-network. The foreign agent then de-capsulates the packets and forwards them to the mobile terminal.

As presently contemplated, AIN principles can be applied in a Mobile IP arrangement as well. In particular, the sub-network in which the mobile terminal is currently located could be considered a serving system, and the terminal's home sub-network could be considered the terminal's home system. Thus, as contemplated, a subscriber's home agent can be programmed to serve as a central control point, somewhat like an HLR or SCP in a wireless network, and the foreign agent can be programmed to employ subscriber profiles for visiting terminals, somewhat like the combined MSC/VLR entity in a wireless network.

In FIG. 2, example serving system 39 is thus shown to comprise a MIP foreign agent ("FA") 78. Typically, FA 78 might be a gateway node on packet network 64, arranged to convert between circuit-switched data and/or voice on one side and packet traffic appropriate for packet network 64 on the other side. However, FA 78 can take other forms. Then somewhat like serving system 36, system 39 would act as a serving system for nomadic stations (whether landline or wireless) that are visiting a given sub-network with which FA 78 is associated. One such station is depicted by way of example as station 80. In turn, packet network 64 is also coupled to (or includes) a home agent ("HA") 82, which, in this example, serves as the home agent for station 80. As such, HA 82 may play the part of an AIN central control point, maintaining a set of service logic and providing call handling instructions to serving system 39. The functionality of HA 82 may reside on an SCP or HLR, for instance.

As thus illustrated, each serving system in network 30 is typically served by one or more particular CCPs, which is usually (but not necessarily) owned and operated by the same carrier that operates the serving system. A CCP in one carrier's system, however, can be arranged to provide AIN functionality to serve subscribers operating in another carrier's system. Alternatively, a CCP in one carrier's system can be arranged to provide AIN functionality for another CCP in the same carrier's system. One way to accomplish this, for instance, is to have one set of CCP service logic communicate with another set of CCP service logic, in order to request and provide instructions on how to handle a given call. The two sets of service logic may reside on separate physical CCP entities or may reside on separate partitions of the same CCP entity (e.g., as landline and wireless segments of a given SCP), or may be in another arrangement. Thus, for instance, when one CCP receives a service request from a serving system, the CCP might responsively forward the request to another CCP, send instructions to another CCP, or seek guidance from another CCP.

As shown in FIG. 2, for instance, SCP 48 might be coupled by a communications link 84 (which could be a packet switched link, for instance) with AS 68. That way, when a serving system on packet network 58 seeks guidance from AS 68, AS 68 can in turn seek guidance from SCP 46. In response to instructions from SCP 46, AS 68 can then pass a signaling message back to the querying serving system, instructing the system how to handle the call. Advantageously, then, a user engaging in communications over a next generation packet switched network can benefit from service logic maintained in another network, such as the user's home telephone network. For instance, the services and features that are applied to the user's home telephone can be applied as well to communications over the next generation network. The same thing can be said for other combinations of networks as well, such as mobile and landline, for instance.

An exemplary embodiment of the invention will now be described with respect to the portion of network 30 comprising serving system 32 (comprising an SSP), representative subscriber station 40, and SCP 48 coupled to the serving system through STP 46. It should be understood, however, that this example applies by analogy to any other network arrangement or combination of network arrangements, such as other portions of FIG. 2, for instance, or other arrangements not shown in FIG. 2. Thus, for example, where this description refers to SCP 48 as the central control point, other types of central control points, possibly with disparate physical and functional arrangements, could be substituted. Similarly, where the description refers to serving system 32 or subscriber station 40, other serving systems or subscribers could be substituted.

Figure 3:
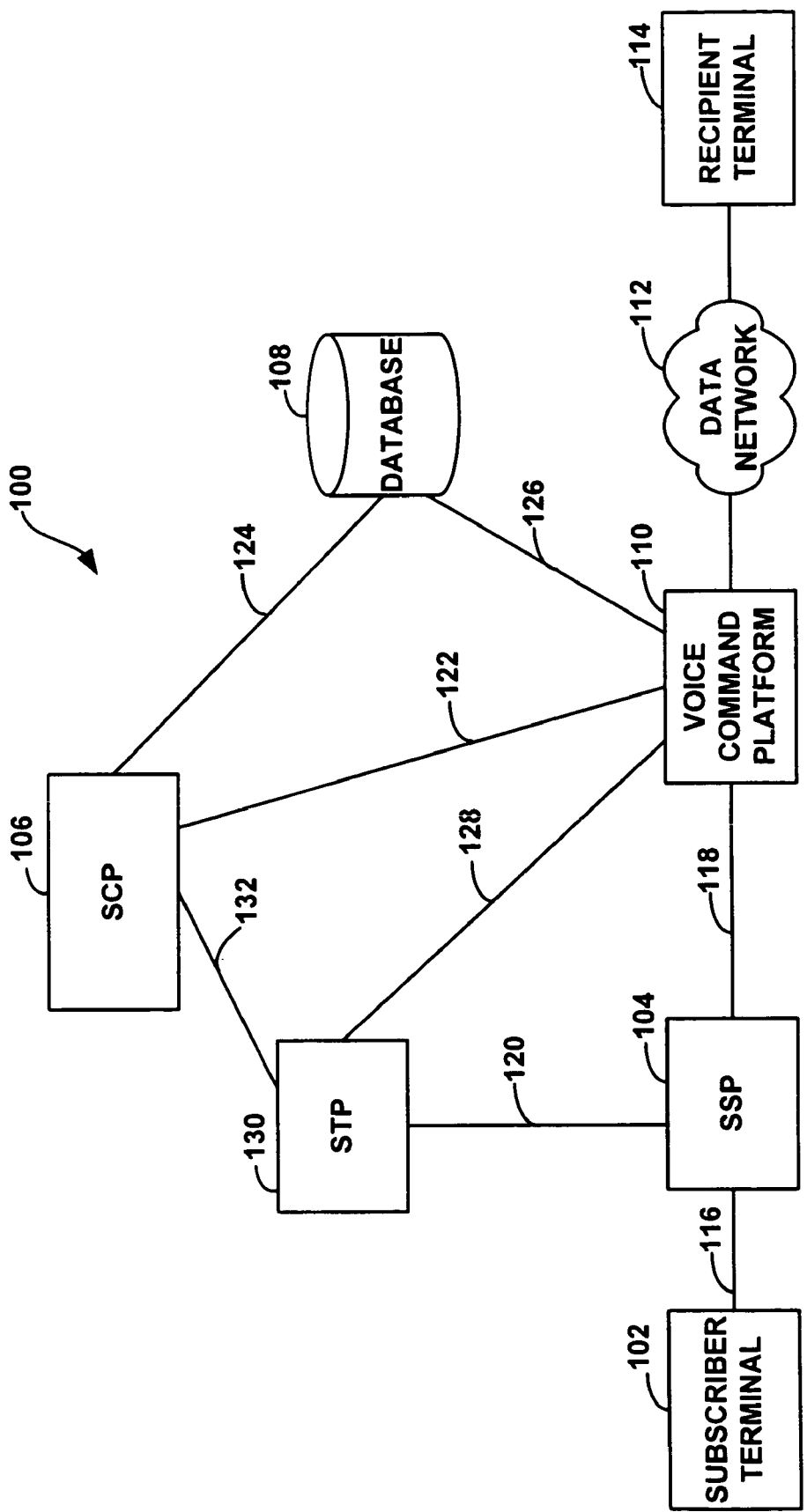
FIG. 3 is a block diagram illustrating a telecommunications network in accordance with the exemplary embodiment.

FIG. 3 illustrates a block diagram of a telecommunications network 100 in which an exemplary embodiment of the present invention can be employed. As shown in FIG. 3, network 100 includes a subscriber terminal 102 and a recipient terminal 114. Terminals 102 and 114 may take any suitable form, such as, for instance, a telephone, a cellular telephone, a computer, a fax machine or a PDA. As an example, terminal 102 and/or terminal 114 may be a code division multiple access ("CDMA") telephone, supporting the IS-95, IS-41 and/or GSM Intersystem Operation Standards ("IOS").

As shown in FIG. 3, terminal 102 is coupled by a communication link 116 to an SSP 104, and SSP 104 is in turn coupled by a voice/data communication link 118 to a voice command platform ("VCP") 110. VCP 110 is then shown coupled to a data network 112, which provides connectivity in turn to terminal 114. Data network 112 may comprise a packet-data network such as the Internet and/or may comprise other networks such a local area network (LAN) or a wireless network, for instance.

As further shown in FIG. 3, SSP 104 is coupled by a signaling path 120 to an STP 130. Also coupled to STP by a link 132 is an SCP 106. Further, VCP 110 is coupled to SCP 106 by a signaling path 122 and to STP 130 by a signaling path 128. With this arrangement, SSP 104 can engage in signaling communications directly with VCP 110 via signaling path 120, STP 130 and signaling path 128. Alternatively, SSP 104 can engage in signaling communications with SCP 106 via signaling path 120, STP 130 and signaling path 132, and SCP 106 can engage in signaling communications with VCP 110 via signaling path 122.

As additionally shown in FIG. 3, network 100 includes a database 108. Database 108 may be included in or accessible to SCP 106 and/or VCP 110. As shown in FIG. 3, for instance, database 108 may be coupled to SCP 106 by a link 124 and to VCP 110 by a link 126.

VCP 110 may facilitate various interactions with users, such as playing announcements, collecting dual-tone-multi-frequency ("DTMF") digits, and recognizing speech. In an embodiment for sending an electronic message from subscriber terminal 102, VCP 110 may be arranged to prompt a user of terminal 102 to start speaking a message, and, upon the end of recording, it may query the user for further instructions. For example, VCP 110 may query the user whether to send the message to a recipient such as recipient terminal 114. Further, VCP 110 may include embedded logic arranged to perform speech-to-text and text-to-speech conversions. In one embodiment, SCP 106 may instruct VCP 110 to perform a conversion based on user profile records associated with recipient terminal 114 and/or user terminal 102.

The VCP 110 may be embedded in one of several conventional platforms. For instance, an Intelligent Peripheral ("IP") may include VCP 110. As known in the art, an IP may be arranged to provide assorted services, including tone generation, voice recognition, playback, compression, call control, recording, and DTMF detection/collection. Alternatively, a service node ("SN") may include VCP 110. A service node may provide voice interactions with users and can facilitate and perform various enhanced services for SSP 104.

According to an exemplary embodiment, database 108 stores subscriber records including mappings between at least two types of destination identifiers. In one exemplary embodiment, database 108 may include mappings between destination identifiers of a first type and destination identifiers of a second type. For instance, the first type of destination identifier may be a Mobile Identification Number ("MIN"), an Internet Protocol ("IP") address or PSTN telephone number of recipient terminal 114, and the second type of destination identifier may be an e-mail address associated with recipient terminal 114 (or user thereof). Other examples are possible as well. In such an embodiment, SCP 106 or VCP 110 may dynamically convert a recipient's destination identifier such as MIN associated with user terminal 114 to an e-mail address associated with a recipient.

Figure 4:
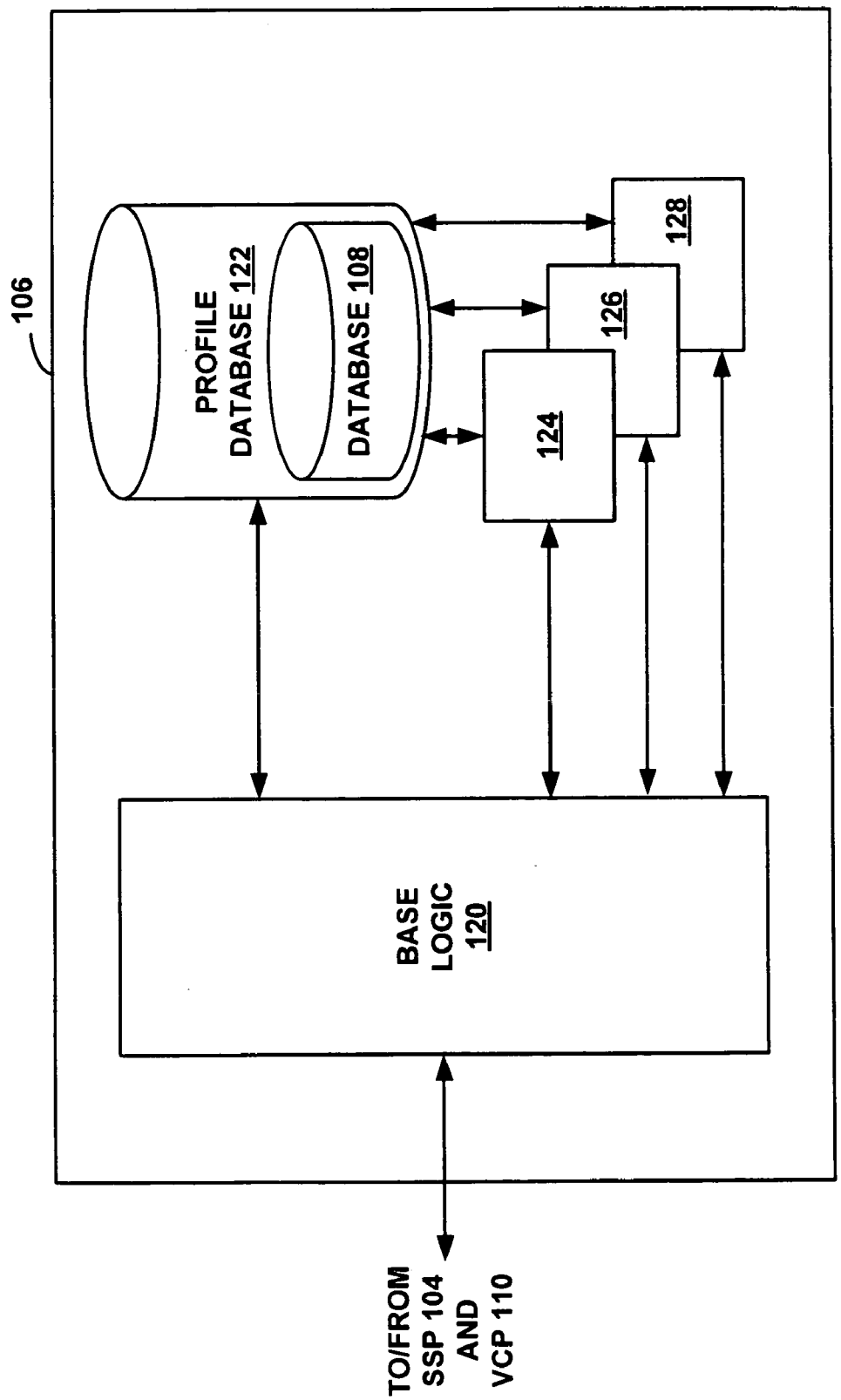
FIG. 4 is a block diagram illustrating a central control point in accordance with the exemplary embodiment.

FIG. 4 is a block diagram illustrating exemplary SCP 106 in greater detail. FIG. 4 illustrates an exemplary embodiment in which database 108 is internally stored on SCP 106. However, it should be understood that SCP 106 may communicate with database 108 via communication link 124, as illustrated in FIG. 3. In FIG. 4, double-headed arrows indicate connections between the components. SCP 106 may be a Telcordia SCP, which typically includes a number of functional components and is therefore also referred to as an Integrated SCP or "ISCP."

SCP 106 includes a base service logic module 120, which defines functionality for decoding and encoding TCAP messages received from and sent to SSP 104. Base service logic module 120 also includes service logic for determining what databases and service logic modules to invoke in order to process the information from the decoded TCAP messages. For example, base service logic module 120 has access to a database 122 containing service profiles of the subscribers. Database 122 further includes database 108 that stores subscriber records including mappings between at least two types of destination identifiers. Each subscriber in a serving system may have a service profile in database 122 that identifies the subscriber by telephone number, MIN or by other indicia. Further, database 122 may include information related to what services the subscriber subscribes to, and what service logic module to run for each service.

The service profile may also include certain service parameters that SCP 106 can use to apply one or more of the customer's services and can thus be considered part of the service logic that SCP 106 will apply to the subscriber. For example, a service profile for a subscriber may include a subscriber's phone number or MIN, and billing information such as account numbers to which calls for the subscriber should be billed, depending on the date or time.

SCP 106 further includes a number of service logic modules 124–128 associated with AIN services. Although three service logic modules are illustrated in FIG. 4 for purposes of illustration only, it should be understood that SCP 106 may include more or fewer service logic modules. To provide a given AIN service, base service logic module 120 may invoke one or more of modules 124–128 as a kind of subroutine call. In particular, base service logic module 120 passes a set of input parameters to the service logic module, and the module returns a set of output parameters out of which base service logic module 120 can encode the TCAP message or messages needed to provide the desired service or with which the base service logic module can perform other functions.

SCP 106 may also take other forms. As an example, for a given subscriber or group of subscribers, SCP 106 may maintain a distinct set of call processing logic, which SCP 106 may employ for calls involving that subscriber or group, rather than, or in addition to, employing a base logic module 120 or special service modules 124–128.

In operation, when SSP 104 receives a request to connect a call from subscriber terminal 102, i.e., when SSP 104 receives dialed digits including a destination identifier of a first type as well as a management code, SSP 104 will apply its own minimal set of service logic for the subscriber, which will typically include a number of trigger points. When SSP 104 encounters such a trigger, it will generate and send to SCP 106 a TCAP message, defining parameters about the call request, i.e. the dialed digits and other parameters. When SCP 106 receives the TCAP message from SSP 104, base logic 120 parses the message to identify the parameters and stores various parameters of the message in a memory unit. Base logic 120 then reads the subscriber profile in database 122 to determine what services the subscriber subscribes to and loads data templates from the subscriber profile to the memory. Once the base service logic 120 finishes executing the appropriate service logic for the subscriber, it may generate and return a response TCAP message to SSP 104. Additionally, base service logic 120 may provide instructions to voice command platform 110.

In accordance with an exemplary embodiment, the service logic that SCP 106 employs for a given subscriber can indicate what SCP 106 should do in response to certain profile management codes dialed by subscribers. For purposes of illustration, an exemplary profile management code template 150 for sending e-mails from subscriber terminals 102 is illustrated in FIG. 5. The template 150 defines logic executable by the SCP 106 upon detecting a predetermined profile management code. Specifically, template 150 defines an action for a profile management code "*62." It should be understood, that this code and action definition is not intended to be limiting, but is intended to illustrate some of many possible codes that can be used to indicate sending an e-mail in accordance with exemplary embodiments of the present invention.

Referring to FIG. 5, the exemplary profile management code template 150 indicates that the dialed digit sequence "*62" means SCP 106 should route a call to voice command platform 110 and, further, that a destination identifier of a second type should be determined based on a destination identifier of a first type and in response to the management code "*62" indicated in a TCAP request message. In one embodiment, the TCAP request message may include management code "*62" appended to a destination identifier of a first type, such as a MIN, a PSTN telephone number or an IP address, associated with recipient terminal 114. For example, a user may dial a digit sequence "*629130081" (management code "*62" appended to a destination identifier of a first type) that is then sent in a TCAP request message to the SCP 106.

In one embodiment illustrated in FIG. 3, database records from database 108 may be employed to determine the destination identifier of the second type, such as an e-mail address associated with a user of recipient terminal 114. In such an embodiment, SCP 106 may then instruct SSP 104 to route the call to VCP 110. SCP 106 may provide routing instructions to SSP 104 in a TCAP response message, for instance. However, different methods could also be used. Further, in such an embodiment, SCP 106 may provide the VCP 110 with the e-mail address associated with recipient terminal 114, as well as a session identifier such as a MIN, a PSTN telephone number or an IP address of subscriber terminal 102.

Once the call is routed to VCP 110, VCP 110 may invoke its own logic to prompt a user of subscriber terminal 102 to speak a message to be sent to recipient terminal 114. Once the user speaks the message, VCP 110 may convert the message to a text format using any existing or later developed voice to text conversion mechanism. Then, VCP 110 may forward the converted message to the e-mail address of recipient terminal 114. In one embodiment, VCP 110 may employ a Simple Mail Transfer Protocol ("SMTP") to send the message to the e-mail address. However, different protocols could also be used.

Alternatively, as described with reference to FIG. 3, VCP 110 (rather than SCP 104) may be the entity that is arranged to convert destination addresses to e-mail addresses (or more generally, to convert destination identifiers of a first type to destination identifiers of a second type). In such a system, when SCP 106 receives a TCAP message including code "*62" appended to, for example, a MIN associated with recipient terminal 114, SCP 106 may instruct SSP 104 to route the call to VCP 110. Further, in such an embodiment, SCP 106 may instruct VCP 110 to do the conversion. For instance, SCP 106 may send to VCP 110 code "*62" appended to the MIN and keyed to a call session identifier associated with a subscriber terminal (such as the MIN of terminal 102), and VCP 110 may be configured to perform the conversion upon receiving a predetermined code such as code "*62". In an alternative embodiment, SCP 106 may instruct VCP 110 to perform the conversion without providing any management codes to VCP 110. Still alternatively, VCP 110 may perform the conversion autonomously (i.e., without instructions from SCP 106).

In an embodiment in which SCP 106 provides a call session identifier to VCP 110, once the call associated with the specified call session identifier is routed to VCP 110, VCP 110 may determine an e-mail address based on the MIN of recipient terminal 114. For example, VCP 110 may communicate with database 108 to retrieve subscriber records and determine the e-mail address associated with recipient terminal 114. Alternatively, database 108 may be a part of VCP 110. In such an embodiment, once the user of subscriber terminal 102 speaks a voice message, VCP 110 may convert the voice message to a text message and forward the converted message as e-mail to recipient terminal via data network 112. In an alternative embodiment, the message sent from subscriber terminal 102 may include voice, as well as text and graphical attachments, and VCP 110 may convert the voice portion of the message to a text message before forwarding the message to recipient terminal 114. In another embodiment, an e-mail message may include an attachment including a voice message spoken by a user associated with subscriber terminal 102. In such an embodiment, the e-mail message may be delivered to recipient terminal 114 without performing any speech to text conversion, and a user associated with recipient terminal 114 may open the attachment and listen to the voice message.

For purposes of illustration, an exemplary destination-identifier-mapping template 200 for a number of subscriber terminals is illustrated in FIG. 6. According to the exemplary embodiment illustrated in FIG. 3, exemplary template 200 may be stored in database 108. Referring to FIG. 6, template 200 defines destination identifier mappings for a several subscribers having phone numbers (913) 123-4567, (913) 234-5678 and (913) 546-7890. The exemplary template records include mappings between the specified phone numbers and e-mail addresses. For instance, as illustrated in FIG. 6, the phone number (913) 123 4567 maps to an e-mail address of john@sprint.com.

It should be understood that destination identifier mappings are not limited to one-to-one mappings, and many alternatives are possible as well. For example, a subscriber may have more than one e-mail account, and each account may have a different e-mail address. In such an embodiment, a template record for the subscriber may map a destination identifier, such as a subscriber's phone number, a MIN or an IP address associated with the subscriber to multiple e-mail addresses for the subscriber.

As another example, database records may include special rules indicating which e-mail address to use for recipient terminal 114 depending on, for example, the date, time, or any other subscriber preferences. For instance, database 108 may include a subscriber record defining a rule that a weekday message for the recipient terminal 114 should be forwarded to two e-mail addresses such as an e-mail address associated with recipient terminal 114 and a work e-mail address associated with the user of recipient terminal 114. Further, the subscriber record may include a second rule pertaining to weekend messages. For example, the second rule may specify that a weekend message should be forwarded to a home e-mail address of the user in addition to the e-mail address associated with recipient terminal 114. It should be understood that these are only exemplary rules, and different rules could also be used.

Alternatively, a management code may be used to specify which e-mail address should be used. For instance, a user of subscriber terminal 102 may select a code "*621" to specify that in addition to an e-mail address of a recipient terminal, the user would like the message to be also sent to a home e-mail address associated with a user of the recipient terminal. Different embodiments are also possible.

Further, it should be understood that template 200 is not intended to be limiting, but is intended to illustrate some of many possible destination identifiers that may be used in accordance with the present invention.

Referring next to FIG. 7, there is shown a flow chart 250 illustrating an exemplary method for providing a message to at least one network entity in a telecommunications network. This exemplary flow chart assumes that destination identifier mappings have been established in advance, and that the destination identifier mappings are stored in database 108. Further, method 250 assumes that a predetermined management code for sending e-mail messages has been provisioned in advance in the telecommunications network.

Beginning at step 252 in FIG. 7, a first entity receives from a subscriber terminal a call request to connect a call from the subscriber terminal to a recipient terminal. The call request includes dialed digits such as a destination identifier of a first type together with a predetermined management code. According to an exemplary embodiment, the destination identifier of the first type is associated with a recipient terminal and may be or include a PSTN telephone number, a MIN identifier or an IP address associated with the recipient terminal. Further, according to the exemplary embodiment illustrated in FIG. 3, the first entity may include SSP 104 that receives from subscriber terminal 102 a call request to connect a call from subscriber terminal 102 to recipient terminal 114.

At step 254, in response to receiving the call request including the predetermined management code, the destination identifier of the first type is converted to a destination identifier of a second type based on or in response to the predetermined management code specified in the call request. According to the exemplary method 250, the destination identifier of the second type may be at least one e-mail address associated with a user of recipient terminal 114.

At step 256, a second entity receives a message from a user of subscriber terminal 102. In one embodiment, the second entity is VCP 110, to which the call from the subscriber terminal is routed from SSP 104. Once the call is routed to VCP 110, VCP 110 may prompt the user of subscriber terminal to speak a message that the user intends to send to one or more e-mail addresses associated with recipient terminal 114. However, it should be understood that the message is not limited to a voice message, and it may also be or include a combination of voice, text and graphics.

At step 258, the message is sent to recipient terminal using the destination identifier of the second type, i.e., at least one e-mail address, determined based on the destination identifier of the first type. In one embodiment, prior to sending the message to recipient terminal 114, VCP 110 may convert the voice message to a text message, and the text message may be delivered via data network 112 to the e-mail address associated with the destination identifier of recipient terminal 114. In an alternative embodiment, the voice message may be attached to the e-mail message, and the e-mail message may be transmitted to recipient terminal 114 without performing voice to text conversions. Once the message is delivered to the e-mail address associated with recipient terminal 114, method 250 terminates.

Figure 8B:
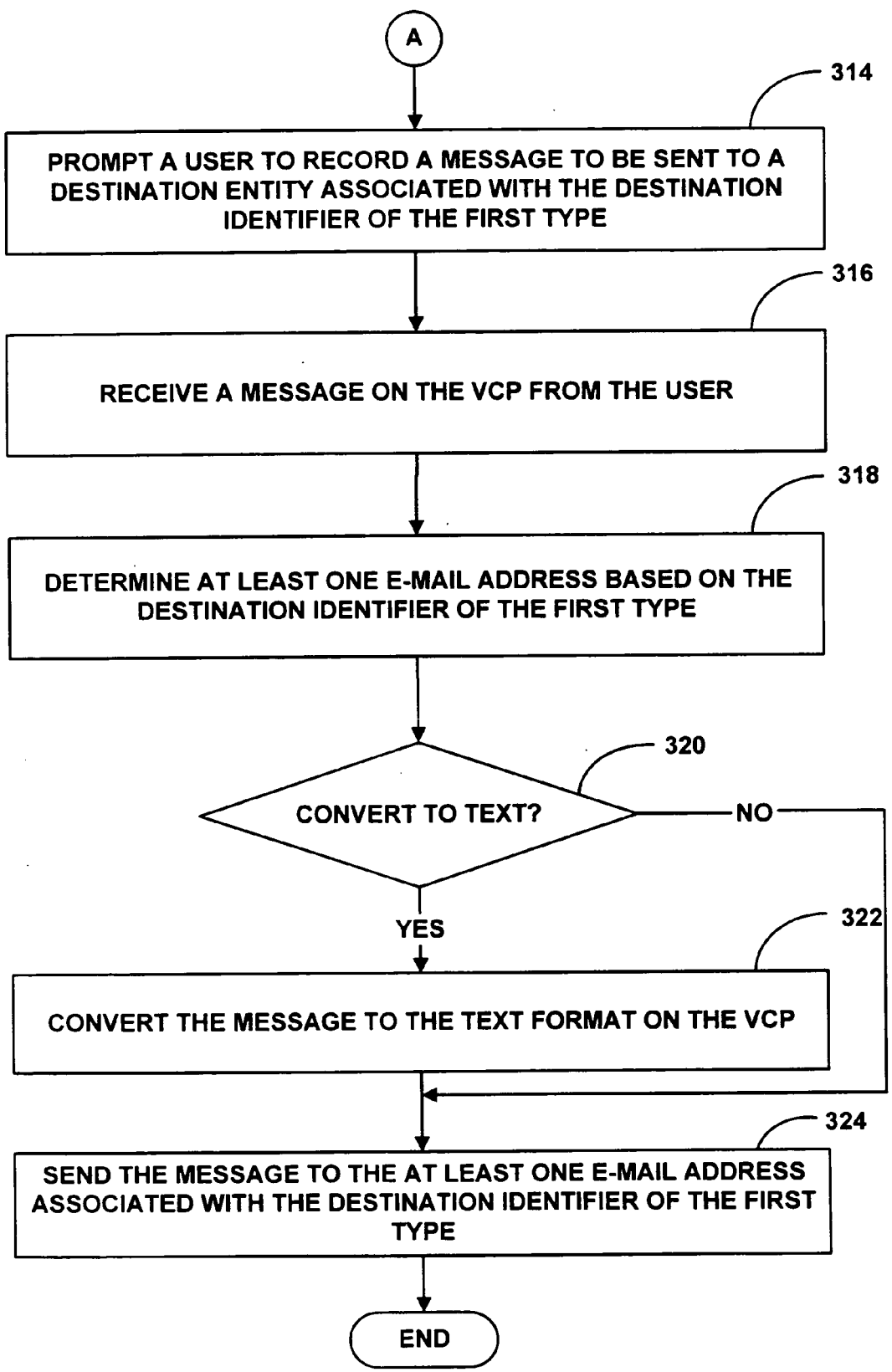

FIGS. 8A and 8B illustrate another exemplary method 300 for providing a message. Specifically, method 300 illustrates providing a message in the exemplary system architecture illustrated in FIG. 3, where a VCP performs the destination identifier conversion.

Beginning at step 302 in FIG. 8A, SSP 104 receives from subscriber terminal 102 a call request to connect a call from subscriber terminal 102 to recipient terminal 114. According to an exemplary embodiment, SSP 104 receives from subscriber terminal 102 dialed digits including a management code and a destination identifier of a first type. The management code may, for instance, be appended to the destination identifier of the first type that is associated with recipient terminal 114. According to an exemplary embodiment, the destination identifier of the first type may be or may include a PSTN telephone number, a MIN identifier or an IP address associated with recipient terminal 114.

At step 304, in response to the call request, SSP 104 generates and sends to a service controller such as SCP 106 a request for call handling instructions. For example, SSP 104 may generate a TCAP query message to request the call handling instructions from SCP 106. The request includes the dialed digits, which in this instance are the management code together with the destination identifier received in the original call request that was received from subscriber terminal 102. At step 306, SCP 106 receives the request and analyzes its parameters such as the management code specified in the request. At step 308, SCP 106 determines whether the management code is a predetermined type of code, namely (in this example) an e-mail management code. If the management code is not an e-mail management code, method 300 terminates.

If SCP 106 determines at step 308 that the management code is an e-mail management code, at step 310, SCP 106 provides call routing instructions to SSP 104. In one exemplary embodiment illustrated in FIG. 4, the call routing instructions include a network address or a routing trunk number associated with VCP 110, so that SSP 104 may route the call request received from subscriber entity 102 to VCP 110. Additionally, SCP 106 provides to VCP 10 the destination identifier of the first type keyed to a call session associated with the call. For example, when the call request is detected on SSP 104, SSP 104 may identify a call session originating at subscriber terminal 102 using a MIN associated with subscriber terminal 102 as a session identifier. In such an embodiment, SSP 104 may employ the session identifier during the communications with SCP 106, and SCP 106 may provide that session identifier to VCP 110. Further, in such an embodiment, the destination identifier of the first type may be appended to the session identifier. In response to receiving the routing instructions from SCP 106, at step 312, SSP 104 routes the call to VCP 110. Then, VCP 110 may determine whether a session identifier in the routed call matches the session identifier received from SCP 106.

Referring to FIG. 8B, at step 314, VCP 110 prompts a user of subscriber terminal 102 to speak a message that the user intends to send to recipient terminal 114. In one embodiment, VCP 110 may prompt the user to speak a message when the call is routed to VCP 110, and further when VCP 110 determines that a session identifier in the routed call matches the session identifier received from SCP 106. At step 316, VCP 110 receives a message from subscriber terminal 102. In one embodiment, the message may be or include a voice message. Alternatively, the message may also include file attachments such as text and/or graphical attachments.

At step 318, VCP 110 determines at least one destination identifier of a second type, which, in this example, is at least one e-mail address associated with recipient terminal 114. To do that, VCP 110 queries subscriber records stored in database 108 to match the destination identifier of the first type to one or more e-mail addresses associated with recipient terminal 114.

At step 320, VCP 110 determines whether to convert the message to a text format. In one embodiment, a subscriber record associated with recipient terminal 114 may include special instructions as to whether messages in a voice format should be converted to a text format prior to transmitting the messages to one or more e-mail addresses associated with recipient terminal 114. In such an embodiment, VCP 110 may be configured to follow those special instructions. Alternatively, VCP 110 may be configured to convert all voice messages to a text format prior to sending the messages to one or more e-mail addresses associated with recipient terminals. If the subscriber record includes instructions to convert the received message to the voice format or if VCP 110, by default, performs conversion for all messages, at step 322, VCP 110 converts the voice message recorded by the user of subscriber terminal 102 to a text message. Still alternatively, VCP 110 could send the voice message as a file attachment in an e-mail message.

At step 324, VCP 110 then sends the message to one or more e-mail addresses determined at step 318. As illustrated in FIG. 8B at step 320, the message may include a converted message or unconverted message. Once the message is transmitted to recipient terminal 114, VCP 110 may provide to subscriber terminal 102 a confirmation message such as "e-mail successfully sent," and method 300 terminates.

An exemplary embodiment of the present invention has been described above. Those skilled in the art will understand, however, that changes and modifications may be made to this embodiment without departing from the true scope and spirit of the present invention, which is defined by the claims.

It should be understood that the method for providing an e-mail message in a telecommunications network is not limited to the use of entities described in reference to FIGS. 8A and 8B. Further, modification may be made as to what functionality is performed at each entity. For example, in an alternative embodiment of the method 300, SCP 106 (rather than VCP 110) may be configured to access database 108 and convert a destination identifier of a first type associated with recipient terminal 114 to one or more e-mail addresses specified in a recipient terminal subscriber record. In such an embodiment, SCP 106 may send one or more e-mail addresses associated with recipient terminal 114 to VCP 106, and the e-mail addresses may be keyed to a session identifier associated with a call originating at subscriber terminal 102. Different embodiments are possible as well.

It will be apparent to those of ordinary skill in the art that methods involved in the system for sending a message to at least one network entity in a telecommunications system may be embodied in a computer program product that includes a computer readable medium. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

What is claimed:

1. A method for providing a message to at least one network entity in a telecommunications network, the method comprising:

receiving a call request to connect a call from an originating subscriber entity, the call request including a destination identifier of a first type and a management code;

corresponding to the destination identifier of the first type, selecting a plurality of destination identifiers of a second type, in response to receiving the management code in the call request;

receiving a message from the subscriber entity; and sending the message to each of a plurality of destination subscriber entities using the plurality of destination identifiers of the second type.

2. A computer readable medium having stored therein instructions to execute the method of claim 1.

3. The method of claim 1, wherein receiving a message from the subscriber entity comprises receiving the message in a voice message format, the method further comprising:

converting the message in the voice message format to a message in a text message format before sending the message to each of the plurality of destination subscriber entities.

4. The method of claim 3, wherein converting the message comprises a voice command platform entity converting the message.

5. The method of claim 1, wherein the call request includes the management code appended to the destination identifier of the first type.

6. The method of claim 1, wherein the destination identifier of the first type is a mobile identification number (MIN).

7. The method of claim 1, wherein each of the plurality of destination identifiers of the second type is an e-mail address.

8. The method of claim 1, wherein receiving a call request to connect a call from an originating subscriber entity to a destination subscriber entity comprises receiving the call request at a switch.

9. The method of claim 8, further comprising:

sending a request for call-handling instructions from the switch to a service controller;

receiving from the service controller an instruction to route the call to a voice command platform; and responsively, routing the call from the switch to the voice command platform.

10. The method of claim 9, further comprising, after receiving the call request on the voice command platform entity, prompting a user of the originating subscriber entity to speak the message.

11. The method of claim 1, wherein convening the destination identifier of the first type to the destination identifier of the second type comprises a service control point converting the destination identifier of the first type to the plurality of destination identifiers of the second type.

12. The method of claim 1, wherein converting the destination identifier of the first type to the plurality of destination identifiers of the second type comprises an intelligent peripheral converting the destination identifier of the first type to the plurality of destination identifiers of the second type.

13. A method for providing an e-mail message to at least one network entity in a telecommunications network, the method comprising:

receiving a call request to connect a call from a first subscriber entity to a second subscriber entity, the call request including a destination identifier combined with a management code;

receiving a voice message from the first subscriber entity, the message being destined for the second subscriber entity;

selecting, according to said request, a given e-mail address from a set at least two e-mail addresses associated with the second subscriber entity;

converting the destination identifier to the given e-mail address, in response to receiving the management code;

converting the voice message to a text message; and sending the text message to the given e-mail address.

14. A computer readable medium having stored therein instructions to execute the method of claim 13.

15. The method of claim 13, wherein the destination identifier is a mobile identification number (MIN).

16. The method of claim 13, wherein receiving the call request comprises a switch receiving the call request, the method further comprising:

sending a request for call-handling instructions from the switch to a service control point;

receiving routing instructions how to route the call from the switch;

routing the call from the switch to a network entity based on the routing instructions;

prompting a user associated with the first subscriber entity to speak the voice message.

17. The method of claim 16, wherein the routing instructions comprise instructions to route the call to a voice command platform.

18. The method of claim 13, wherein converting the destination identifier to the given e-mail address comprises a voice command platform converting the destination identifier to the given e-mail address.

19. The method of claim 13, wherein converting the destination identifier to the given e-mail address comprises a service controller converting the destination identifier the given e-mail address.

20. The method of claim 19, further comprising:

providing the given e-mail address from the service controller to a voice command platform;

receiving a message on the voice command platform; and the voice control platform sending the message to the given e-mail address.

21. The method of claim 13, wherein selecting a given email address comprises applying stared rules for indicating which of the set at least two e-mail addresses to select as the given e-mail address.

22. The method of claim 21, wherein the stored rules comprise:

a first rule for selecting a first e-mail address as the given e-mail address during a first time period; and a second rule for selecting a second e-mail address as the given e-mail address during a second time period.

23. The method of claim 21, wherein the stored rules comprise:

sending a weekday message to a work e-mail; and sending a weekend message to a home e-mail.

24. The method of claim 13, wherein selecting the given e-mail address comprises applying a set of subscriber preferences to select the given e-mail address.

25. The method of claim 13, wherein selecting the given e-mail address comprises selecting the given e-mail address based on the management code.

26. A system for providing a message to at least one network entity, the system comprising:

a first network entity receiving a call request to connect a call from a first subscriber entity to a second subscriber entity, the call request including a destination identifier of a first type and a management code, and responsive to receiving the call request including the management code, the first network entity sending a request for call-handling instructions to a second network entity, the request for call-handling instructions including the destination identifier of the first type and the management code;

the second network entity, responsive to receiving the request for call-handling instructions from the first network entity, selecting, according to said request, a given destination identifier of the second type from a plurality of destination identifiers of the second type associated with the destination identifier of the first type, converting the destination identifier of the first type to the given destination identifier of the second type and further providing the given destination identifier of the second type to a third network entity, the second network entity further providing routing instructions for the first network entity; and the third network entity prompting a user associated with the first subscriber entity to speak a message, and further, sending the message to a recipient associated with the destination identifier of the second type provided by the second network entity.

27. The system of claim 26, wherein the first network entity comprises a switch, the second network entity comprises a service controller, and the third network entity comprises a voice command platform.

28. The system of claim 26, wherein the third network entity is further receiving a voice message from the subscriber entity, converting the voice message to a text message, and sending the text message to the destination identifier of the second type.

29. The system of claim 26, wherein the destination identifier of the first type is a mobile identification number (MIN).

30. The system of claim 26, wherein the plurality of destination identifier of the second type associated with the destination identifier of the first type are a plurality of e-mail address associated with the second subscriber entity.

31. At a network entity, a method for providing a message to at least one subscriber entity in a communications system comprising:

receiving a call request being routed from a subscriber entity, the call being associated with a destination identifier of a first type and a management code;

responsive to receiving the call request, prompting a user associated with the subscriber entity to speak a message; and determining at least one destination identifier of a second type based on the destination identifier of the first type and based on the management code, wherein the at least one destination identifier of the second type is determined from a group of many destination identifiers of the second type associated with the destination identifier of the first type.

32. The method of claim 31, wherein the network entity is a voice command platform.

33. The method of claim 31, further comprising:

receiving instructions from a second network entity to determine the at least one destination identifier of the second type based on the received instructions, wherein determining the at least one destination identifier of a second type is further based on the received instructions.

34. The method of claim 33, wherein the second network entity comprises a service controller.

35. The method of claim 31, wherein the network entity receives the destination identifier of the first type and the management code in the call request.

36. The method of claim 31, wherein the message is a voice message, and further comprising:

converting the voice message to a text message; and sending the text message to the at least one destination identifier of the second type.

37. A method for providing an email message to at least one network entity in a telecommunications network, the method comprising:

receiving a call request to connect a call from an originating subscriber entity to a destination subscriber entity, the call request including a telephone number and a management code, wherein the management code includes indicia for initiating a conversion from a telephone number to an e-mail address, and wherein the management code further includes indicia for selecting a given e-mail address from two or more e-mail addresses associated with the telephone number;

selecting the given e-mail address from two or more e-mail addresses associated with the telephone number;

receiving a voice message from the subscriber entity; and sending the voice message to the given e-mail address.

38. The method of claim 37, wherein indicia for selecting a given e-mail address comprises indicia for selecting a home e-mail address associated with a user of the destination subscriber entity.

* * * * *